US012338836B1

(12) United States Patent
Liang

(10) Patent No.: US 12,338,836 B1
(45) Date of Patent: Jun. 24, 2025

(54) MAGNETIC SUCTION FAN

(71) Applicant: GUANGDONG TCOMAS TECHNOLOGY CO., LTD, Huizhou (CN)

(72) Inventor: Zhenzhi Liang, Guangdong (CN)

(73) Assignee: GUANGDONG TCOMAS TECHNOLOGY CO., LTD, Huizhou (CN)

( * ) Notice: Subject to any disclaimer, the term of this patent is extended or adjusted under 35 U.S.C. 154(b) by 0 days.

(21) Appl. No.: 18/783,338

(22) Filed: Jul. 24, 2024

(30) Foreign Application Priority Data

Dec. 26, 2023 (CN) ......................... 202323559420.7

(51) Int. Cl.
*F04D 29/64* (2006.01)
*F04D 25/06* (2006.01)
*F04D 25/16* (2006.01)
*F04D 29/60* (2006.01)
*H01R 13/62* (2006.01)

(52) U.S. Cl.
CPC ....... *F04D 29/646* (2013.01); *F04D 25/0613* (2013.01); *F04D 25/0693* (2013.01); *F04D 25/166* (2013.01); *F04D 29/601* (2013.01); *H01R 13/6205* (2013.01)

(58) Field of Classification Search
CPC ............... F04D 29/646; F04D 25/0613; F04D 25/0693; F04D 25/166; F04D 29/601; H01R 13/6205
See application file for complete search history.

(56) References Cited

U.S. PATENT DOCUMENTS

2024/0369075 A1* 11/2024 Liang ........................ G06F 1/20

FOREIGN PATENT DOCUMENTS

CN 219282087 U * 6/2023
CN 219938853 U * 10/2023

* cited by examiner

*Primary Examiner* — Hoang M Nguyen

(57) ABSTRACT

A magnetic suction fan includes a fan and a bracket, the bracket is connected below the fan, a power supply male terminal and a power supply female terminal are arranged on a side surface of the bracket, one power supply male terminal is matched with and electrically connected to a power supply female terminal of another bracket, and magnetic suction components I and magnetic suction components II are arranged on two sides of an interior of the bracket. Through the above technical solutions, the splicing and electrical connection between several brackets can be achieved, only one external power interface is needed to supply power to brackets and fans above the brackets. The magnetic suction fan not only has less power interface requirements, but also the bracket has no bulges, when used alone, it can not cause insufficient space because of the bulges.

10 Claims, 10 Drawing Sheets

MAGNETIC SUCTION FAN

CROSS-REFERENCE TO RELATED APPLICATIONS

This application claims priority of Chinese Patent Application No. 202323559420.7, filed on Dec. 26, 2023, the entire contents of which are incorporated herein by reference.

TECHNICAL FIELD

The present disclosure relates to the field of radiators, and in particular, to a magnetic suction fan.

BACKGROUND

The fan is generally used for radiators, chassis and other equipment, and the bracket undertakes the function of fixing and connecting the fan.

In the prior art, the fan bracket usually only has the function of a single fixed fan, and the common building block fans on the market not only have bulges, but also need additional accessories to achieve splicing, which wastes space and is complicated to operate. When several fans are used in the existing chassis, several power supply lines are required, which is not only difficult to arrange, but also limits the number of fans due to the number of chassis interfaces, and the scalability is not strong. Therefore, there is a need for a splicable fan that is convenient to splice, has no bulges on the bracket, and only requires one power supply port to supply power.

SUMMARY

A purpose of the present disclosure is to provide a magnetic suction fan to overcome the shortcomings of the prior art.

The purpose of the present disclosure is achieved by the following technical solutions.

A magnetic suction fan includes a fan and a bracket, the bracket is connected below the fan, the fan is connected to the bracket by means of screws or magnetic suction or buckles, etc., the bracket is electrically connected to the fan, and the bracket supplies power to the fan; a power supply male terminal and a power supply female terminal are arranged on a side surface of the bracket, and one power supply male terminal is matched with and electrically connected to one power supply female terminal of another bracket; when several brackets are evenly arranged horizontally, one power supply male terminal of one bracket is electrically connected to one power supply female terminal of another bracket to connect circuits in several brackets, and a first bracket is supplied power by an external power supply component, achieving a function of supplying power to several fans with one power supply interface; and magnetic suction components I and magnetic suction components are arranged on two sides of an interior of the bracket, the magnetic suction component I and the magnetic suction component II include at least one magnet, the position and quantity of magnetic suction components I and magnetic suction components II match, and one magnetic suction component I is attracted to one magnetic suction component II of another bracket, achieving a splicing effect when several brackets without several bulges are evenly arranged horizontally.

In one of the embodiments, the magnetic suction component I includes at least one magnet, and the magnetic suction component II includes at least one magnet; the magnetic suction component I includes strong magnetic materials, and the magnetic suction component II includes magnets; and the magnetic suction component I includes magnets, and the magnetic suction component II includes strong magnetic materials, as long as the magnetic suction component I is attracted to the magnetic suction component II.

In one of the embodiments, when evenly arranged in a transverse direction, the brackets are adsorbed mutually for connection and electrically connected, several brackets achieve an electrical connection through the characteristics of cooperation of connecting the power supply male terminal and the power supply female terminal, and achieve a fixation through mutual adsorption of one magnetic suction component I and one magnetic suction component II of another bracket, achieving a function of supplying power to several appliances using only one external power interface, and achieving a function of mutual splicing of several brackets without bulges mutual.

In one of the embodiments, the power supply male terminal is arranged on a side surface of the bracket relative to the power supply female terminal, an outer surface of the power supply male terminal is on the same plane as the side surface of the bracket, an outer surface of the power supply female terminal is on the same plane as the side surface of the bracket, and the power supply female terminal and the power supply male terminal are plane terminals.

In one of the embodiments, a top surface of the bracket is arranged with an external bracket power supply port, the external bracket power supply port supplies electric energy for the fan, and a conduction circuit is set at the interior of the bracket; the external bracket power supply port, the power supply male terminal and the power supply female terminal are electrically connected through the conduction circuit, when several brackets are spliced, the circuits are interconnected; and the power supply male terminal is matched with and connected to the external connection power supply component, and the external connection power supply component supplies power to the bracket.

In one of the embodiments, a fan connection power supply port is arranged at a bottom surface of the fan, the fan connection power supply port is electrically connected to a motor of the fan, and the motor of the fan obtains electrical energy from the fan connection power supply port to drive a motor to rotate; and the fan connection power supply port is matched with and electrically connected to the external bracket power supply port, aligning the fan connection power supply port on the bottom surface of the fan with the external bracket power supply port and inserting the fan connection power supply port, at this time, a circuit between the fan and the bracket is connected, which can supply power to the fan when the bracket is connected to an external power supply.

In one of the embodiments, the external connection power supply component includes an external connector, an external power supply female terminal, a wire and a power interface terminal, the external power supply female terminal is electrically connected to one end of the wire, and the other end of the wire is connected to the power interface terminal, the power interface terminal is connected to an external power supply to obtain electric energy, and the electric energy of the external power supply is transmitted to the spliced bracket through the wire, and the electric energy is used by the fan connected to the external bracket power supply port above the bracket.

In one of the embodiments, the external connector is arranged with an external connector magnetic suction position, the external connector magnetic suction position is rectangular, and the external connector magnetic suction position includes magnets; a bracket external power supply magnetic suction position is arranged on the side surface of the bracket, the bracket external power supply magnetic suction position includes magnets; and the bracket external power supply magnetic suction position is located at the interior of the bracket, the bracket external power supply magnetic suction position is located next to the power supply male terminal, and the external connector magnetic suction position is attracted to the bracket external power supply magnetic suction position.

In one of the embodiments, the external connector magnetic suction position protrudes from the external connector, and an outer side of the bracket external power supply magnetic suction position is arranged with a bracket magnetic suction groove, the bracket magnetic suction groove accommodates the external connector magnetic suction position, and the protruding external connector magnetic suction position is fixed by the bracket magnetic suction groove, avoiding shaking of the external connection power supply component during adsorption.

In one of the embodiments, two protruding bracket buckles are arranged on the side surface of the bracket, the bracket buckles are L-shaped, fan buckles are arranged on a side surface of the fan, the bracket buckles are matched with the fan buckles, and the fan is fixed on the bracket by inserting the bracket buckles into the fan buckles.

The present disclosure has beneficial effects:

Due to the adoption of the above-mentioned technical solutions, the present disclosure utilizes the characteristics of mutual adsorption between the magnetic suction components I and the magnetic suction components II at the interior of the bracket, and uses the plane terminal to make the power supply male terminal and the power supply female terminal, to achieve a function of mutual splicing of several brackets without bulges; and when several brackets are spliced, the circuits between each other are connected, to achieve a function that only one external power supply interface and one external connection power supply component are needed to supply power for several brackets and the fans above the brackets. The magnetic suction fan not only has less power interface requirements, but also the bracket has no bulges, when used alone, it can not cause insufficient space because of the bulges. The splicing of magnetic suction is not only convenient to install, but also the adsorption characteristics of being paired in pairs make the splicing error-free. When the fan needs to be replaced after splicing, it can also be easily replaced separately, which has good scalability.

BRIEF DESCRIPTION OF THE DRAWINGS

In order to more clearly explain the technical solutions of the embodiments of the disclosure, in the following, the drawings needed in the embodiments will be described briefly. It is to be understood that the following drawings only show some embodiments of the disclosure, therefore, it is not to be regarded as a limitation of scope. Those of ordinary skill in the art may further obtain other accompanying drawings based on these accompanying drawings without creative efforts.

Figure 1:
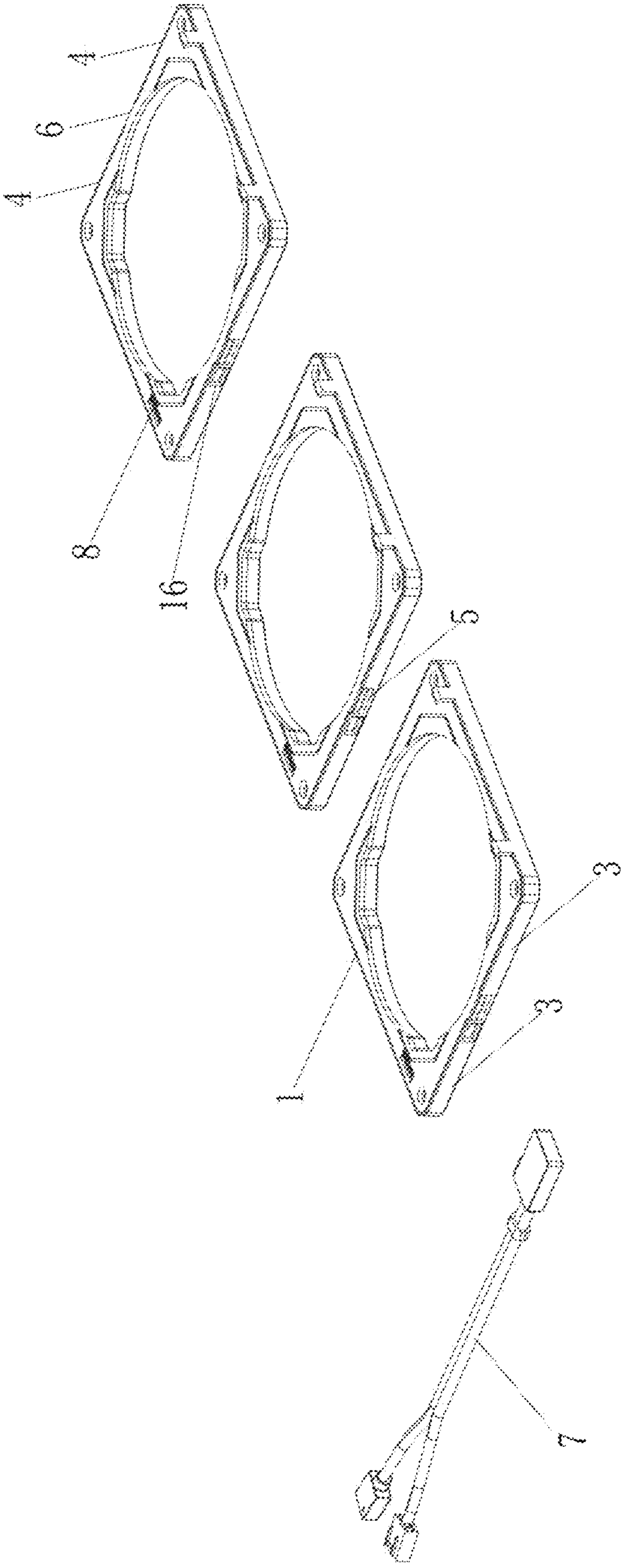
FIG. 1 is a splicing schematic diagram I of the present disclosure.

Reference numerals and denotations thereof: 1—bracket, 2—fan, 3—magnetic suction component I, 4—magnetic suction component II, 5—power supply male terminal, 6—power supply female terminal, 7—external connection power supply component, 8—external bracket power supply port, 9—fan connection power supply port, 10—external power supply female terminal, 11—wire, 12—power supply interface terminal, 13—external connector, 14—external connector magnetic suction position, 15—bracket external power supply magnetic suction position, 16—bracket magnetic suction position groove, 17—bracket buckle, and 18—fan buckle.

DETAILED DESCRIPTION OF THE EMBODIMENTS

In order to facilitate the understanding of the present disclosure, the following will refer to the relevant drawings to describe the present disclosure more comprehensively. The preferred embodiments of the present disclosure are shown in the attached drawings. However, the present disclosure can be realized in many different forms and is not limited to the embodiments described in this application. On the contrary, the purpose of providing these embodiments is to make a more thorough and comprehensive understanding of the public contents of the present disclosure.

It is to be noted that when a component is called "fixed to" another component, it can be directly on another component or it can also exist in the center of the component. When a component is considered to be "connected" to another component, it can be directly connected to another component or there may be a centered component at the same time. The terms "vertical", "horizontal", "left", "right" and similar expressions used in this application are for illustrative purposes only and are not intended to be the only embodiment.

Unless otherwise defined, all technical and scientific terms used in this application have the same meaning as those commonly understood by technicians in the technical field of the present disclosure. The terms used in the specification of the present disclosure in this application are only for the purpose of describing the specific embodiments, not to limit the present disclosure. The term "and/or" used in this application includes any combination and all combinations of one or more related listed items.

Figure 2:
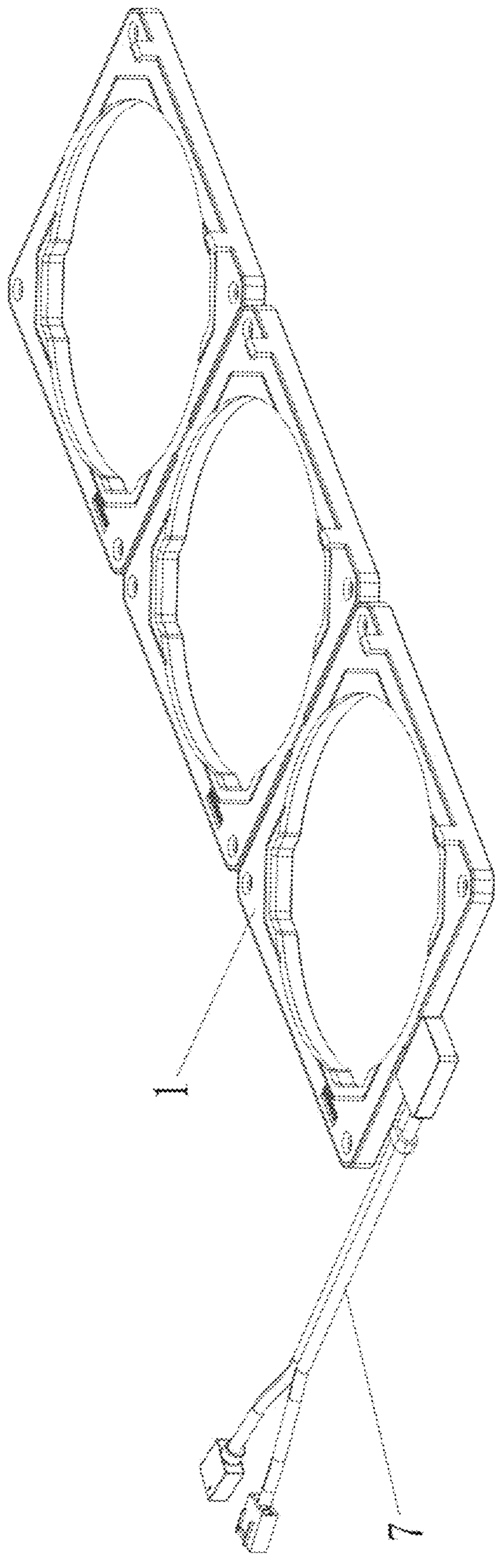
FIG. 2 is a splicing schematic diagram II of the present disclosure.
Figure 3:
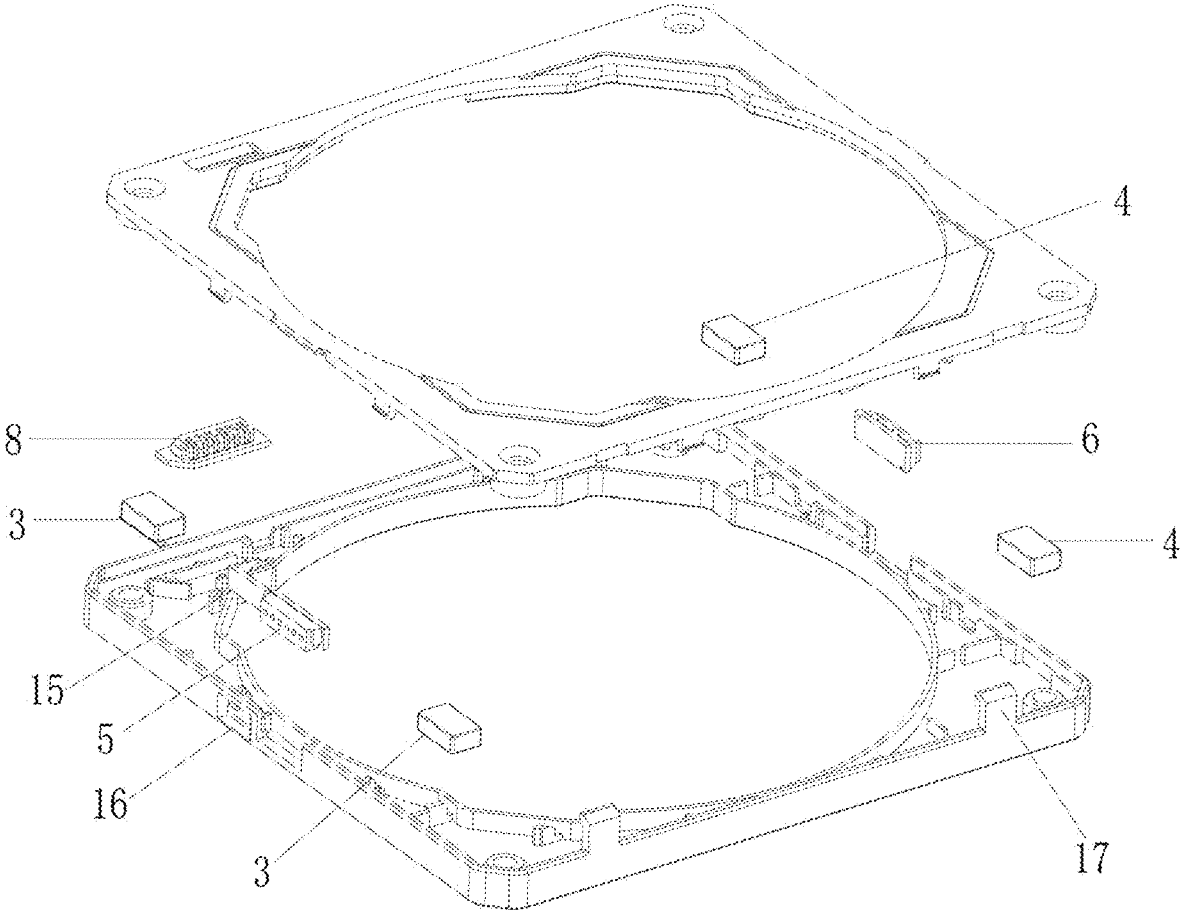
FIG. 3 is an explosion diagram of a bracket.
Figure 4:
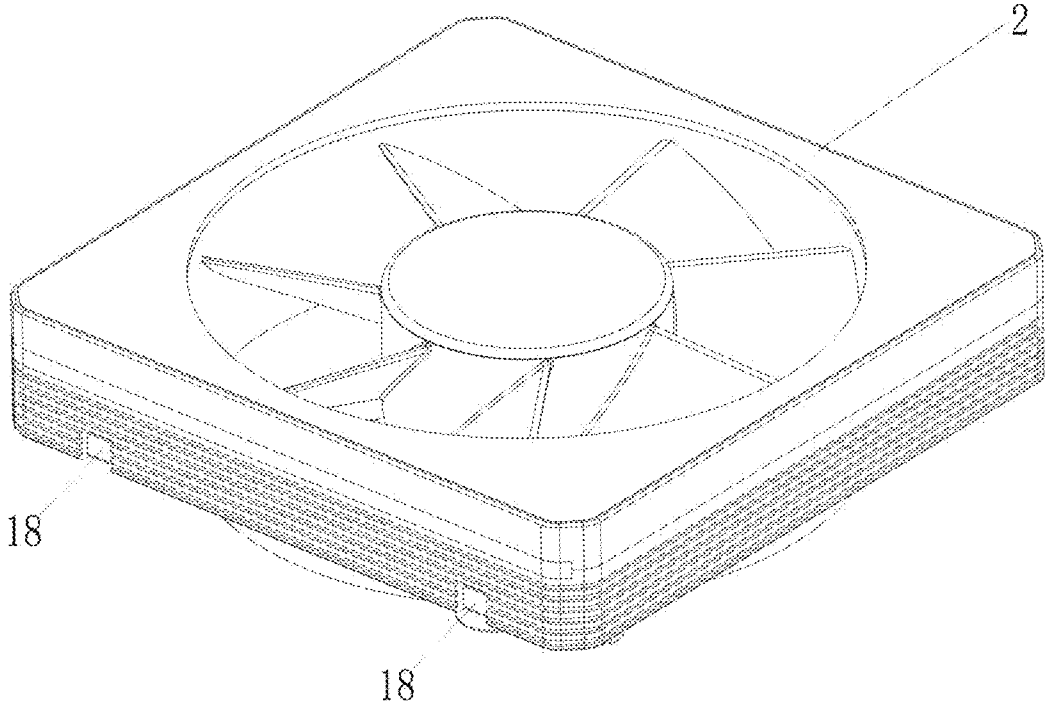
FIG. 4 is a three-dimensional diagram I of a fan.
Figure 5:
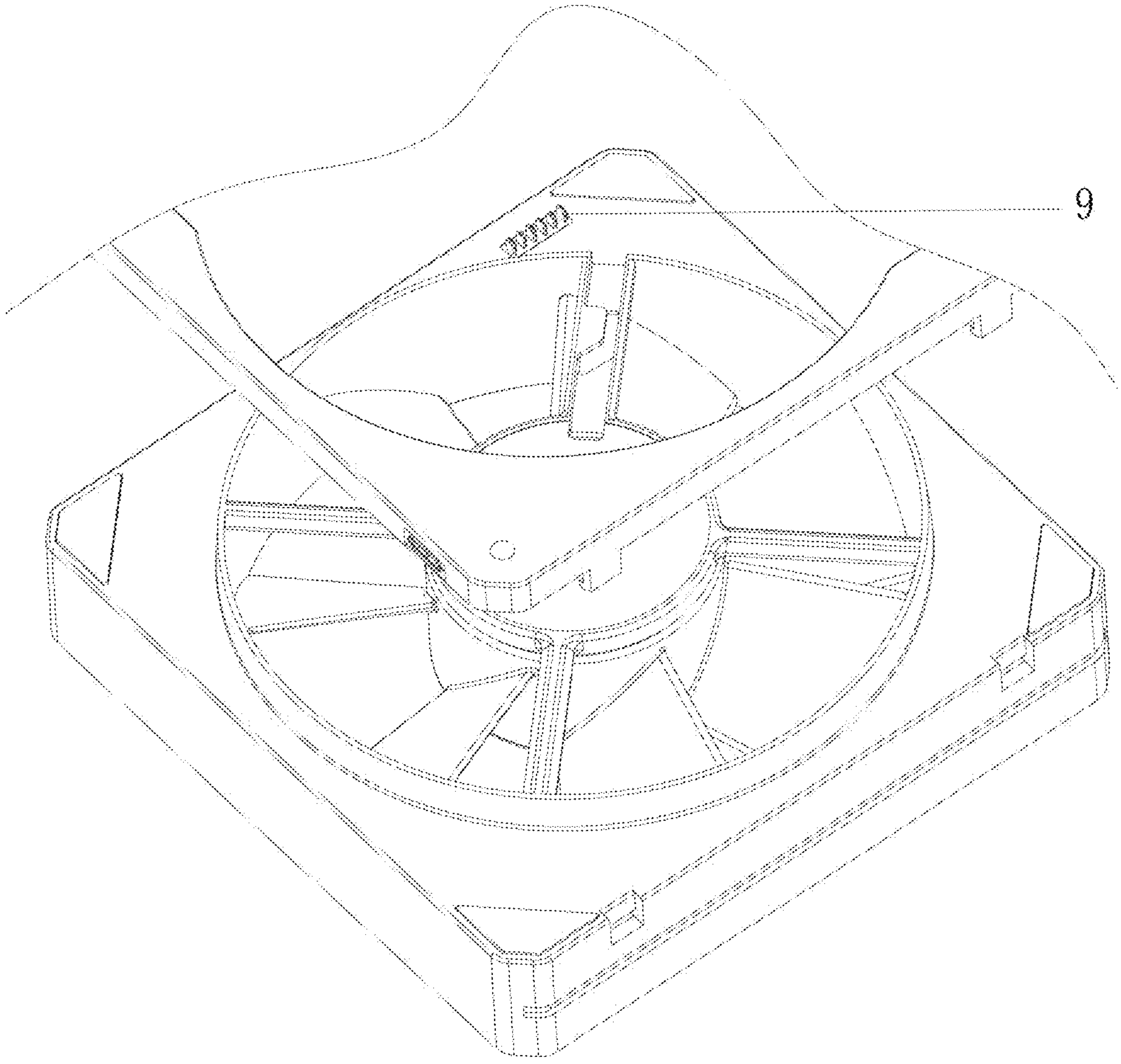
FIG. 5 is a three-dimensional diagram II of a fan.
Figure 6:
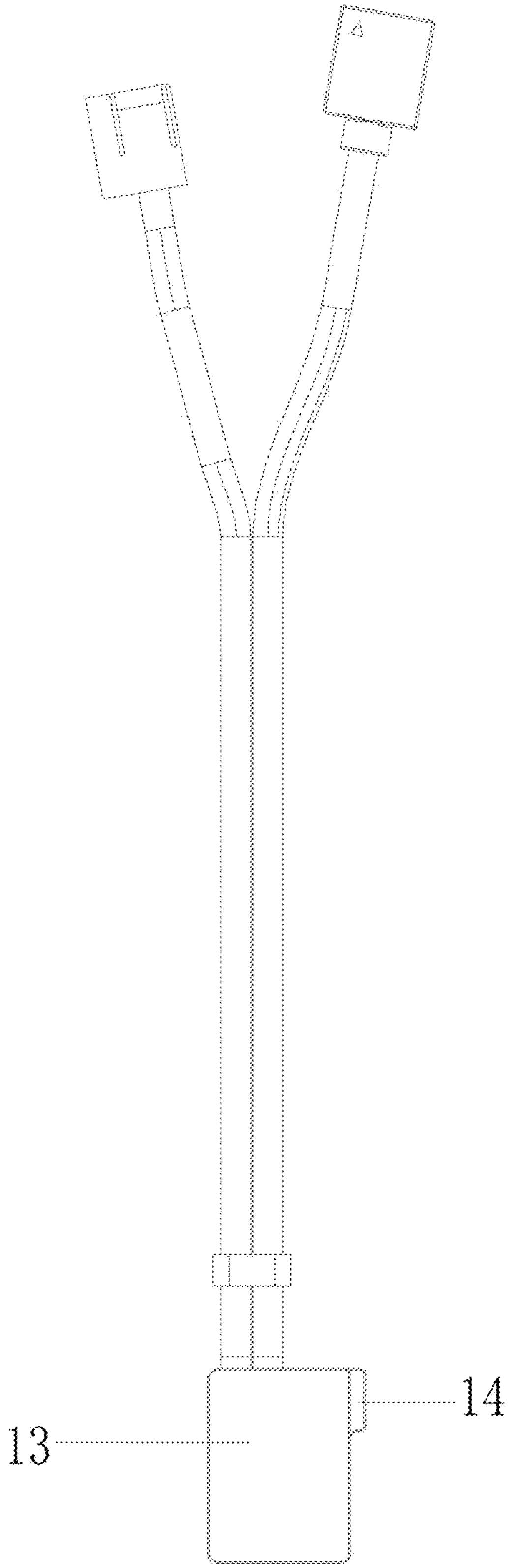
FIG. 6 is a main view of an external connection power supply component.
Figure 7:
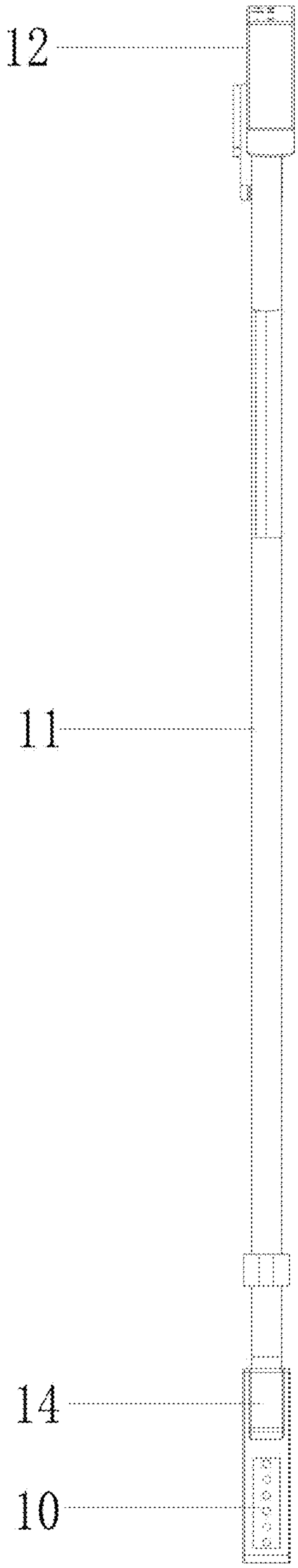
FIG. 7 is a right side view of an external connection power supply component.
Figure 8:
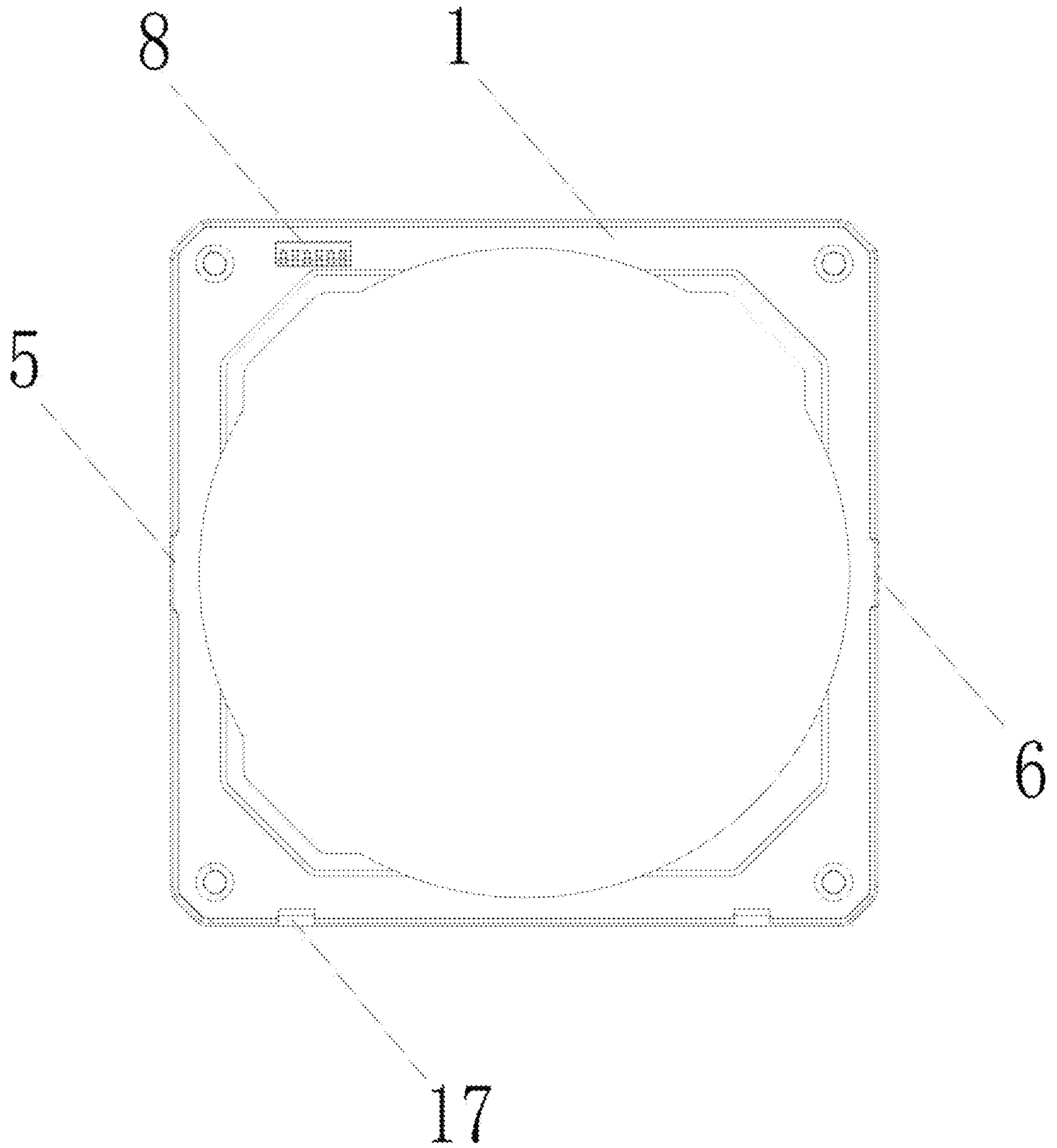
FIG. 8 is a main view of a bracket.
Figure 9:
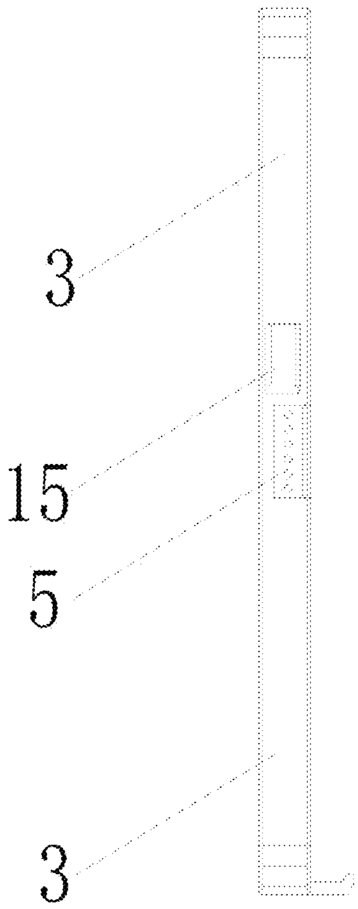
FIG. 9 is a left side view of a bracket.
Figure 10:
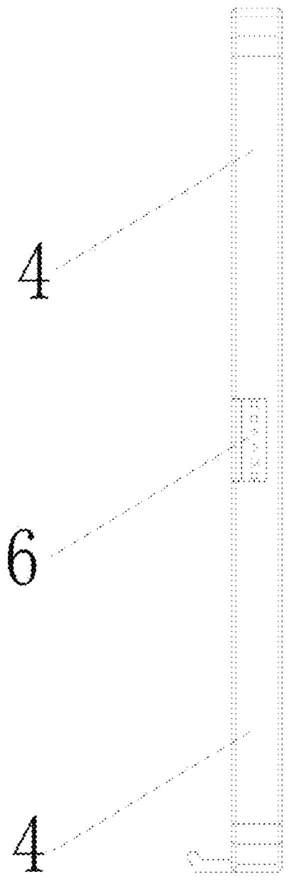
FIG. 10 is a right side view of a bracket.

The embodiments of the present disclosure refer to FIGS. 1 to 10.

A magnetic suction fan includes a fan 2 and a bracket 1, the bracket 1 is connected below the fan 2, and the bracket 1 is electrically connected to the fan 2; a power supply male terminal 5 and a power supply female terminal 6 are arranged on a side surface of the bracket 1, and one power supply male terminal 5 is matched with and electrically connected to one power supply female terminal 6 of another bracket 1; and magnetic suction components I 3 and magnetic suction components II 4 are arranged on two sides of an interior of the bracket 1, the magnetic suction component I 3 and the magnetic suction component II 4 are located on two sides of an interior of the bracket 1, the quantity of the magnetic suction components I 3 and the magnetic suction components II 4 is consistent, and one magnetic suction component I 3 is attracted to one magnetic suction component II 4 of another bracket 1.

By adopting the above technical solution, a lower part of the fan 2 is connected to the splicable bracket 1 with a circuit by means of screws, magnetic suction, buckles, etc., a power supply male terminal 5 and a power supply female terminal 6 are arranged on a side surface of the bracket 1, and one power supply male terminal 5 is matched with and electrically connected to one power supply female terminal 6 of another bracket 1; when several brackets 1 are evenly arranged horizontally, one power supply male terminal 5 of one bracket 1 is electrically connected to one power supply female terminal 6 of another bracket 1 to connect circuits in several brackets 1, and a first bracket 1 is supplied power by an external power supply component, achieving a function of supplying power to several fans with one power supply interface; and magnetic suction components I 3 and magnetic suction components 4 which include at least one magnet are arranged on two sides of an interior the bracket 1, the quantity of the magnetic suction components I 3 and the magnetic suction components 4 is consistent and the position is matched, and one magnetic suction component I 3 is attracted to one magnetic suction component II 4 of another bracket 1, achieving a splicing effect when several brackets 1 without bulges are evenly arranged horizontally.

Preferably, the magnetic suction component I 3 includes at least one magnet, and the magnetic suction component II 4 includes at least one magnet.

By adopting the above technical solution, one magnetic suction component I 3 including at least one magnet is attracted to one magnetic suction component II including at least one magnet, and one of the magnetic suction component I 3 and the magnetic suction component II 4 includes strong magnetic materials.

Preferably, when evenly arranged in a transverse direction, the brackets 1 are adsorbed mutually for connection and electrically connected.

By adopting the above technical solution, several brackets 1 achieve an electrical connection through characteristics of cooperation of connecting the power supply male terminal 5 and the power supply female terminal 6, and achieve a fixation through mutual adsorption of one magnetic suction component I 3 and one magnetic suction component II 4 of another bracket 1, achieving a function of supplying power to several appliances using only one external power interface, and achieving a function of mutual splicing of several brackets 1 without bulges.

Preferably, the power supply male terminal 5 is arranged on a side surface of the bracket 1 relative to the power supply female terminal 6, an outer surface of the power supply male terminal 5 is on the same plane as the side surface of the bracket 1, and the outer surface of the power supply female terminal 6 is on the same plane as the side surface of the bracket 1.

By adopting the above technical solution, the power supply male terminal 5 and the power supply female terminal 6 are plane terminals, the power supply male terminal 5 located on the opposite side of bracket 1, and the power supply female terminal 6 and the side surface of the bracket 1 are on the same plane.

Preferably, a top surface of the bracket 1 is arranged with an external bracket power supply port 8, a conduction circuit is set at the interior of the bracket 1; and the external bracket power supply port 8, the power supply male terminal 5 and the power supply female terminal 6 are electrically connected through the conduction circuit, and the power supply male terminal 5 is matched with and connected to an external connection power supply component 7.

By adopting the above technical solution, the external bracket power supply port 8 at the top surface of the bracket 1 supplies power to the fan 2, the external bracket power supply port 8, the power supply male terminal 5 and the power supply female terminal 6 are connected by the conduction circuit at the interior of the bracket 1, and when several brackets 1 are spliced, the circuits are interoperable, the power supply male terminal 5 is matched with and electrically connected to the external connection power supply component 7, and the external connection power supply component 7 supplies power to the bracket 1.

Preferably, a fan connection power supply port 9 is arranged at a bottom surface of the fan 2, the fan connection power supply port 9 is electrically connected to a motor of the fan 2, and the fan connection power supply port 9 is matched with and electrically connected to the external bracket power supply port 8.

By adopting the above technical solution, the fan connection power supply port 9 at the bottom surface of the fan 2 is electrically connected to the motor of the fan 2, the motor of the fan 2 obtains electrical energy from the fan connection power supply port 9 to drive a motor to rotate, and the fan connection power supply port 9 is matched with and electrically connected to the external bracket power supply port 8, which can supply power to the fan 2 when the bracket 1 is connected to an external power supply.

Preferably, the external connection power supply component 7 includes an external connector 13, an external power supply female terminal 10, a wire 11 and a power interface terminal 12, the external power supply female terminal 10 is electrically connected to one end of the wire 11, and the other end of the wire 11 is connected to the power interface terminal 12.

By adopting the above technical solution, the external power supply female terminal 10 of the external connection power supply component 7 is electrically connected to one end of the wire 11, and the other end of the wire 11 of the external connection power supply component 7 is connected to the power interface terminal 12, the power interface terminal 12 is connected to an external power supply to obtain electric energy, and the electric energy of the external power supply is transmitted to the spliced bracket 1 and the fan 2 through the wire 11.

Preferably, the external connector 13 is arranged with an external connector magnetic suction position 14, and the external connector magnetic suction position 14 includes magnets; and a bracket external power supply magnetic suction position 15 is arranged on the side surface of the bracket 1, the bracket external power supply magnetic suction position 15 includes magnets, and the external connector magnetic suction position 14 is attracted to the bracket external power supply magnetic suction position 15.

By adopting the above technical solution, the external connector magnetic suction position 14 of the external connector 13 is rectangular, magnets are arranged in the external connector magnetic suction position 14, the bracket external power supply magnetic suction position 15 including magnets is arranged on the side surface of the interior of bracket 1, the bracket external power supply magnetic suction position 15 is located next to the power supply male terminal 5, and the external connector magnetic suction position 14 is attracted to the bracket external power supply magnetic suction position 15.

Preferably, the external connector magnetic suction position 14 protrudes from the external connector 13, an outer side of the bracket external power supply magnetic suction position 15 is arranged with a bracket magnetic suction groove 16, and the bracket magnetic suction groove 16 accommodates the external connector magnetic suction position 14.

By adopting the above technical solution, the external connector magnetic suction position 14 protrudes from the external connector 13, an outer side of the bracket external power supply magnetic suction position 15 is arranged with the bracket magnetic suction groove 16, and the bracket magnetic suction groove 16 accommodates the external connector magnetic suction position 14, and the protruding external connector magnetic suction position 14 is fixed by the bracket magnetic suction groove 16, avoiding shaking of the external connection power supply component 7 during adsorption.

Preferably, two protruding bracket buckles 17 are arranged on the side surface of the bracket 1, the bracket buckles 17 are L-shaped, and fan buckles 18 are arranged on a side of surface of the fan 2, and the bracket buckles 17 are matched with the fan buckles 18.

By adopting the above technical solution, two protruding bracket buckles 17 are arranged on the side surface of the bracket 1, the bracket buckles 17 are matched with the fan buckles 18, and the fan 2 is fixed on the bracket 1 by inserting the bracket buckles 17 into the fan buckles 18.

Working principle: the characteristics of mutual adsorption between the magnetic suction components I and the magnetic suction components II at the interior of the bracket are utilized, and the plane terminal is utilized to make the power supply male terminal 5 and the power supply female terminal 6, to achieve a function of mutual splicing of several brackets 1 without bulges, when several brackets 1 are spliced, the circuits between each other are connected, to realize a function that only one external power supply interface and one external connection power supply component 7 are needed to supply power for several brackets 1 and fans 2 above the brackets.

When installing, the power interface terminal 12 of the external connection power supply 7 is connected to the external power interface, and the external power supply terminal 10 is connected to the power supply male terminal 5 on the side of the bracket 1, according to their own need, splicing an appropriate number of brackets 1 and installing fans 2 above the brackets 1 to complete the installation.

The above embodiments only express several embodiments of the present disclosure, the description is more specific and detailed, but it can not be understood as a limitation on the scope of the disclosure patent. It is to be pointed out, that for the ordinary technical personnel in this field, some deformations and improvements can be made without departing from the idea of the disclosure, and the deformations and improvements belong to the scope of protection of the present disclosure. Therefore, the scope of protection of the present disclosure patent is to be subject to the attached claims.

The invention claimed is:

1. A magnetic suction fan, comprising a fan (2) and a bracket (1), wherein the bracket (1) is connected below the fan (2), and the bracket (1) is electrically connected to the fan (2); a power supply male terminal (5) and a power supply female terminal (6) are arranged on a side surface of the bracket (1), and one power supply male terminal (5) is matched with and electrically connected to one power supply female terminal (6) of another bracket (1); and magnetic suction components I (3) and magnetic suction components II (4) are arranged on two sides of an interior of the bracket (1), and one magnetic suction component I (3) is attracted to one magnetic suction component II (4) of another bracket.

2. The magnetic suction fan according to claim 1, wherein the magnetic suction component I (3) comprises at least one magnet, and the magnetic suction component II (4) comprises at least one magnet.

3. The magnetic suction fan according to claim 1, wherein when evenly arranged in a transverse direction, the brackets (1) are adsorbed mutually for connection and electrically connected.

4. The magnetic suction fan according to claim 1, wherein the power supply male terminal (5) is arranged on a side surface of the bracket (1) relative to the power supply female terminal (6), an outer surface of the power supply male terminal (5) is on the same plane as the side surface of the bracket (1), and an outer surface of the power supply female terminal (6) is on the same plane as the side surface of the bracket (1).

5. The magnetic suction fan according to claim 1, wherein a top surface of the bracket (1) is arranged with an external bracket power supply port (8), and a conduction circuit is arranged at the interior of the bracket (1); and the external bracket power supply port (8), the power supply male terminal (5) and the power supply female terminal (6) are electrically connected through the conduction circuit, and the power supply male terminal (5) is matched with and connected to an external connection power supply component (7) and connected.

6. The magnetic suction fan according to claim 5, wherein a fan connection power supply port (9) is arranged at a bottom surface of the fan (2), the fan connection power supply port (9) is electrically connected to a motor of the fan (2), and the fan connection power supply port (9) is matched with and electrically connected to the external bracket power supply port (8).

7. The magnetic suction fan according to claim 5, wherein the external connection power supply component (7) comprises an external connector (13), an external power supply female terminal (10), a wire (11) and a power interface terminal (12), the external power supply female terminal (10) is electrically connected to one end of the wire (11), and the other end of the wire (11) is connected to the power interface terminal (12).

8. The magnetic suction fan according to claim 7, wherein the external connector (13) is arranged with an external connector magnetic suction position (14), and the external connector magnetic suction position (14) comprises magnets; and a bracket external power supply magnetic suction position (15) is arranged on the side surface of the bracket (1), the bracket external power supply magnetic suction position (15) comprises magnets, and the external connector magnetic suction position (14) is attracted to the bracket external power supply magnetic suction position (15).

9. The magnetic suction fan according to claim 8, wherein the external connector magnetic suction position (14) protrudes from the external connector (13), and an outer side of the bracket external power supply magnetic suction position (15) is arranged with a bracket magnetic suction groove (16), and the bracket magnetic suction groove (16) accommodates the external connector magnetic suction position (14).

10. The magnetic suction fan according to claim 1, wherein two protruding bracket buckles (17) are arranged on the side surface of the bracket (1), the bracket buckles (17) are L-shaped, fan buckles (18) are arranged on a side surface of the fan (2), and the bracket buckles (17) are matched with the fan buckles (18).

* * * * *